United States Patent [19]
Bradford et al.

[11] Patent Number: 5,566,020
[45] Date of Patent: Oct. 15, 1996

[54] MICROSCOPY SYSTEM

[76] Inventors: Robert W. Bradford; Gregory D. Yent, both of 1180 Walnut Ave., Chula Vista, Calif. 92011

[21] Appl. No.: 142,300
[22] PCT Filed: Jan. 29, 1992
[86] PCT No.: PCT/US92/00670
§ 371 Date: Nov. 22, 1993
§ 102(e) Date: Nov. 22, 1993
[87] PCT Pub. No.: WO93/15428
PCT Pub. Date: Aug. 5, 1993
[51] Int. Cl.$^6$ ............................ G02B 21/06; G02B 21/36
[52] U.S. Cl. ........................ 359/390; 359/363; 359/385
[58] Field of Search ................................. 359/362–363, 359/368, 385–389, 383–384; 348/73–80; 250/201.3, 205; 354/79; 382/133, 274

[56] References Cited

U.S. PATENT DOCUMENTS

| | | | |
|---|---|---|---|
| 4,331,132 | 5/1981 | Mukasa | 348/79 |
| 4,643,540 | 2/1987 | Kawasaki et al. | 359/363 |
| 4,725,720 | 2/1988 | Sawada et al. | 250/201.3 |
| 4,887,892 | 12/1989 | Bacus | 382/133 |
| 4,911,543 | 3/1990 | Hodgson | 359/385 |
| 5,006,872 | 4/1991 | Parker | 354/79 |
| 5,497,267 | 3/1996 | Iskikawa et al. | 359/390 |

*Primary Examiner*—Thong Nguyen
*Attorney, Agent, or Firm*—Charles C. Logan, II

[57] ABSTRACT

A microscopy system designed to achieve upwards of 12,000× magnification with simultaneous high resolution of better than 0.3 microns and over 30 microns depth-of-field. The microscopy system utilizes a conventional research microscope having a plurality of objective magnification lenses that produce the initial magnification with acceptable limits of high resolution and depth-of-field. A projection housing is combined with the research microscope in a unique manner where it receives the initial magnification and greatly increases that magnification while still maintaining the high resolution and depth-of-field obtained during the initial magnification. A light source used to illuminate the specimen platform from its underside is located remotely therefrom and connected by a fiber optic cable to a condensing lens positioned beneath the specimen platform. This allows for high intensity lighting of the specimen while keeping it away form the detrimental heat of the source of high intensity light. The projection housing has projected image receiving means therein whose distance from its projection lens can be varied to vary the magnification produced by projection.

7 Claims, 2 Drawing Sheets

MICROSCOPY SYSTEM

TECHNICAL FIELD

The invention relates to microscopes and more specifically to a high magnification microscopy system with improved high resolution and depth-of-field at 6,000× magnification and greater.

BACKGROUND ART

In medical microscopy the objective is to get three things, as good a resolution as possible, as much magnification as you can resolve, and the best depth of field as possible. These objectives in the design of optical systems generally require compromises. In a standard optical microscope the depth of field is inversely proportional to the magnification. As the magnification gets higher the depth of field gets narrower. If the object being viewed is sufficiently small that you have to magnify it to the point your eye can see it, the depth of field gets so narrow that there is no contour to what you are looking at and it blurs since there is no depth of field.

Another aspect in terms of microscopy is the fact that up until a few years ago blood was believed to be sterile. It was thought there was no fungus or bacteria in blood except under severe pathological conditions. Today, systemic micro-organisms in the blood have changed the early thinking that blood was sterile. The discovery of AIDS has resulted in a complete new understanding of the immune system of opportune organisms that take advantage of a depressed immune system. The standard research microscope cannot be used to study organisms because they are too small. In these microscopes the power of magnification is about 1000× or 1500×. Some sophisticated systems are available where you can get 2000×, and 2500×, but the depth of field gets so narrow they are only used for research. What is needed for examination of blood for its organisms is magnification in excess of 5000×. Also the depth of field must be sufficient that the total contour of the organisms can be seen. To give a general idea of the problem, if a person wants to see a red blood cell they need a depth of field of at least 7 microns. If the depth of field drops to 3½ microns, it is only possible to see half the red blood cell. As the depth of field becomes progressively less, a person can only see a slice of the blood cell. If the interest being researched relates to membranes and things of this sort, a different approach has to be taken to break out of the limitations of a standard optical system.

Another important criteria that hadn't been looked at is most research microscopes concentrate on what is known as dark field microscopy. The problem is how do you illuminate and contrast what you want to look at? Also what type of light source could be used to try to enhance the contrast? Some of the new microorganisms need to be studied and are not seen in dark fields. It is therefore necessary to go to other types of optical modes, like phase contrasts, polarized light, as well as dark fields. This gets into things like differential interference phase. These are different ways of enhancing different types of light. As it turns out, it is necessary to do all of the three or four types of optical modes in addition to increasing magnification and depth of field. Due to the physics of optics, you can only get so much magnification if you want to maintain some sort of depth-of-field. It was determined that optimal magnification must be around 400× instead of 1000×. Therefore in order to gain the degree of required magnification necessary for visible analysis, it was determined that projection magnification could be used in conjunction with the initial optical magnification. A unique microscopy system has been designed by the applicants to combine a projection lens with the research microscope after it has received its optical magnification. The extra magnification produced by the projection lens does not affect the depth of field as the beam spreads out. The projected image may be received by a video camera and it is moved either toward or away from the projection lens in order to vary the amount of magnification. The resolution lens of the camera thus becomes a limitation. As better cameras and camera systems are developed, the resolution can be increased in the higher priced camera. It is important that the candle power required to illuminate the object has to be greater than what is presently used with research microscopes. The best microscopes on the market today have approximately 80 watts of illumination. This is clearly insufficient when we are talking about magnification levels of 10,000 or greater. It is therefore necessary that the light source be in the order of 150 watts of light so that there is in the order of 100 candle power available by the time the object is being viewed. When the T.V. camera is used it also requires so many candle power of lumens in order to get full color out of the camera.

In order to be able to use cheaper projection lenses, the system has been designed to only use the central flat portion of the lens which is substantially of the same quality for expensive lens and cheaper lenses.

It has been found that the basic system works quite well with a halogen white light 150 watts bulb. Since such a bulb would give off too much heat if positioned beneath the specimen platform, it has been necessary to locate the light source in a remote housing with its light being directed through a fiber optic cable whose exit end is positioned beneath the specimen platform. This is highly important because when it is desirable to look at live blood, extreme heat will destroy the organisms in the blood. Electron beam microscopes will go to 250,000× and they use an electron beam for resolution so that they have good resolution and high magnification. The problem is that you destroy the live blood specimen when it is under normal conditions on the specimen platform. A condenser lens is used at the front end of the fiber optic cable to focus the beam. This allows the system to be changed from one optical mode to another, such as, dark field, bright field, phase-contrast, single side band differential interference phase-contrast, and polarized and neutral density bright field.

The projection lens positioned in the bottom end of the projection tube allows the light to come out at about a thirty degree angle, but the only portion worried about is the center portion and the remainder is absorbed in the interior of the projection tube. Since the projected image is received on the camera lens the movement of the camera upwardly and downwardly in the projection tube will vary the magnification. When the camera is lowered to its lowest position, the magnification is that of the optical magnification system. When the camera is raised to its highest position, its magnification can go up as high as 12,000× with a 150 watts light source, but its depth of field remains unchanged between its lowest and highest positions since that has been determined entirely by the optical magnification, and not by the variable projection magnification. This opens a whole new window in medical microscopy because now small microorganisms can be seen with their alterations or destruction in the membrane integrity. The camera will produce whatever it sees in the tube housing on a video monitor at a size up to 40 times greater, depending on the size of the monitor. The depth of field on the video system remains constant.

The limitations and resolution relates to the light source that is used. The closer one comes to monochromatic or single wave length light the better the resolution will be. If higher magnification is required and better resolution necessary, it would simply be a matter of going to a laser type of light.

DISCLOSURE OF INVENTION

The novel microscopic system has been designed to combine an optical magnification portion and a variable projection magnification portion. The optical magnification occurs through the objective magnification lenses that form the basic structure of a research microscope. The variable projection magnification is produced in the projection tube and by a moving camera connected to a video monitor.

A light source housing containing a high intensity light such as a 150 watts bulb has its light directed through fiberoptic cable into the base of the microscope with the front end of the fiberoptic cable being mounted in a collar having a condensing or collimating lens positioned in its top opening. The light that passes through the condensing lens then travels upwardly through the specimen platform and the slide mounted thereon. The image projected upwardly through the objective magnification lens is then passed to the projection lens at the top end of a tubular member attached to the optical housing of the research microscope. The entire amount of optical magnification occurs up to and including the projection lens so that any further magnification beyond the projection lens does not affect the depth of field. As the image passes through the projection lens it is dispersed and magnified. Only the portion of the image in the center of the projection lens is being viewed. This is what is seen on the lens of the T.V. camera mounted thereabove. The remainder of the projected image is captured by the interior of the blackened walls of the projection tube. By operating the motor connected to the top end of the T.V. camera, the T.V. camera can be made to move upwardly or downwardly thus varying the amount of projection magnification. The variable projection system of the T.V. camera itself magnifies the image to the resulting size that is seen on the video monitor. The video monitor can also be connected to a VCR or a video printer. It would also be possible to replace the T.V. camera in the projection tube with a photographic plate for capturing the projected image.

The prior art is limited by a finite number of magnification steps, a limited amount of available light for imaging, existing light sources damage samples with corresponding heat, limited depth of field, spherical aberations, close proximity of sample-to-objective lens distance, diffraction effects from finite sized lens elements, and field resolution from low quality lenses. The objects and advantages of the novel microscopy system are: 1) continuously variable magnification for each objective lens allowing optimization for sample size, 2) a high intensity light source coupled by fiber optic cable provides sufficient light without damage to the sample, 3) constant depth of field for a variable magnification, 4) reduced spherical aberations by using only the flat center portion of the imaging and projection lens, 5) increased resolution with constant depth of field, 6) reduced diffraction effects by elimination of lenses, 7) objective lens to sample distance increased by allowing magnification to occur elsewhere (above projection lens), 8) projection length determined by shape of projection lens, 9) imaging medium provides additional magnification, 10) variable projection magnification is independent of type or nature of light source, and 11) variable projection magnification is independent of imaging medium.

BEST MODE FOR CARRYING OUT THE INVENTION

Figure 1:
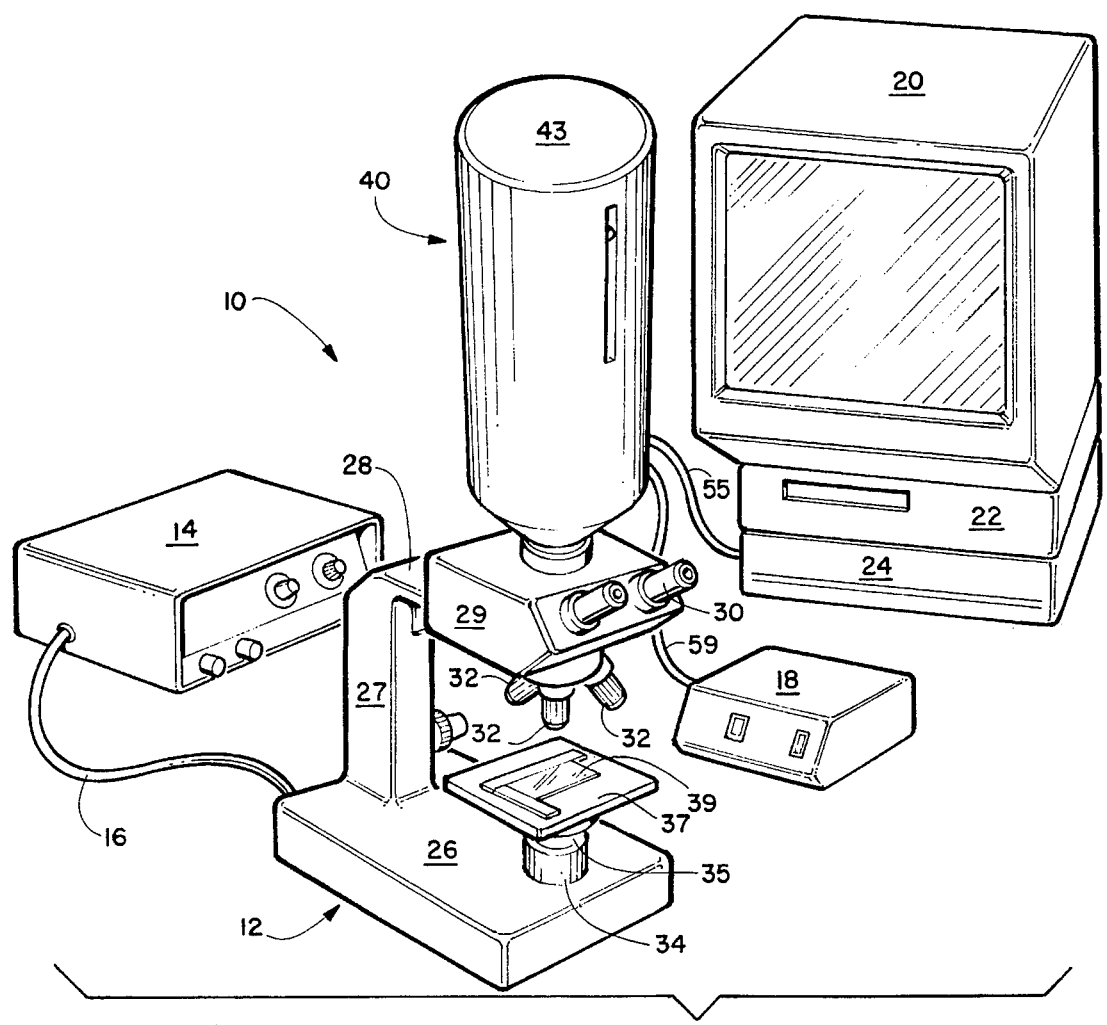
FIG. 1 is a front perspective view illustrating the components of the novel microscopy system.
Figure 2:
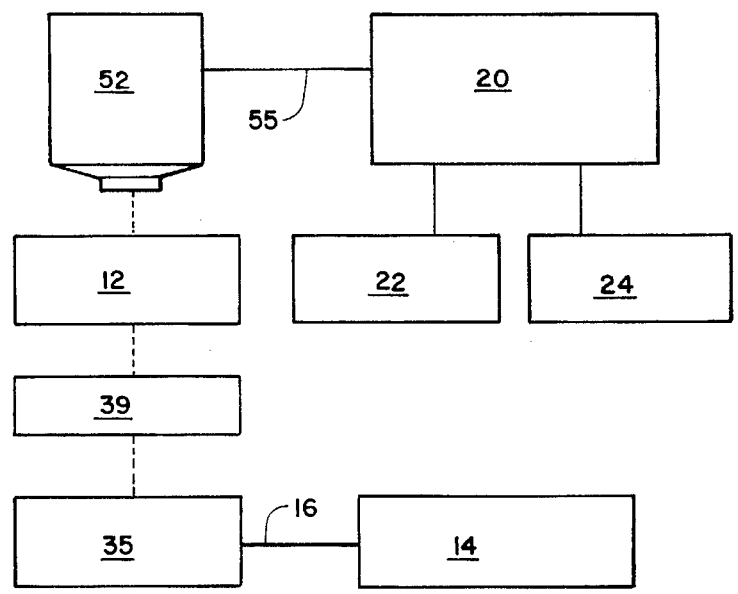
FIG. 2 is a block diagram of the components of the novel microscopy system.
Figure 3:
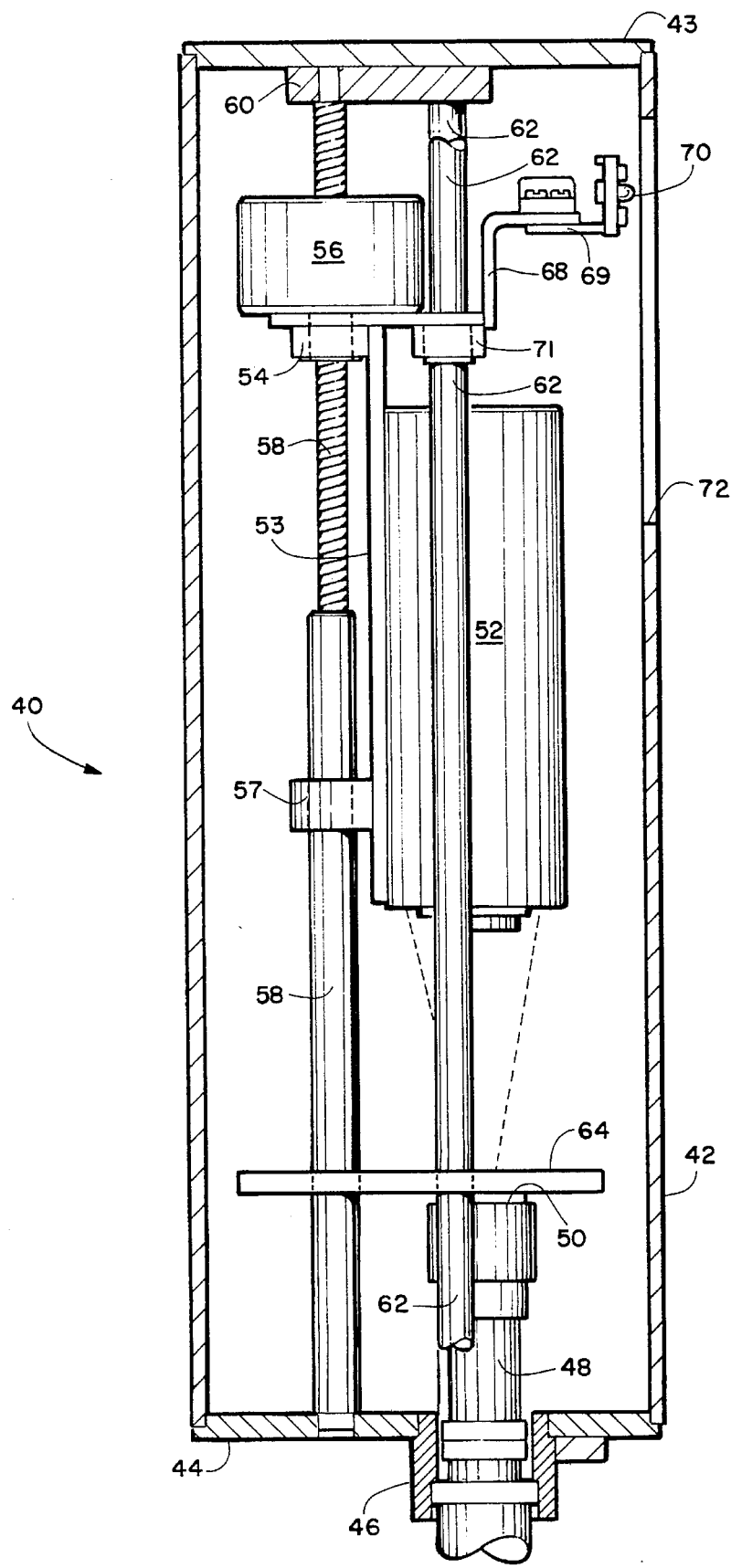
FIG. 3 is a vertical cross sectional view of the projection tube mounted on the optical housing.

The novel microscopy system is generally designated numeral 10 and it will be described by referring to FIGS. 1–3 of the drawings. The major components of the microscopy system 10 are research microscope 12, light source housing 14, fiber optic cable 16, power unit 18, video monitor 20, VCR 22, and video printer 24.

Microscope 12 has a base 26, a post 27, an arm 28, and an optical housing 29. Viewing eye pieces 30 and a plurality of objective power magnification lenses 32 are connected to optical housing 29. A collar 34 mounted on the top surface of base 26 has a condensing lens 35 mounted in its top end. A specimen platform 37 has a slide 39 positioned thereon. Projection housing or tube 40 is mounted on the top surface of optical housing 29.

Projection housing 40 has a tubular member 42 having a top cover plate 43 and a bottom plate 44. An adapter collar 46 mounts projection housing 40 on the top end of optical housing 29. Tubular sleeve 48 of microscope 12 passes upwardly through adapter collar 46 and it has a projection lens 50 mounted in the eyepiece of the microscope. T.V. camera 52 is supported by camera backplate 53 that is attached to motor support block 54. Electrical cable 55 connects camera 52 to video monitor 20. Motor 56 is mounted on motor support rod 58 whose top end is journaled in top bearing rod support 60. Motor support rod 58 freely passes through an aligned bore hole in motor support block 54. A bearing block 57 is also attached to camera backplate 53 and bearing block 57 has a bore hole that allows it to freely travel up and down the bottom end of motor support rod 58. A pair of laterally spaced vertical support shafts 62 insure the alignment of motor 56 as it travels upwardly and downwardly along motor support rod 58. Electrical cable 59 connects power unit 18 to motor 56. Projection lens holddown plate 64 has an aperture through which projection image passes and also bore holes that allows it to be raised and lowered on members 58 and 62. Position indicator plate 68 has a LED support bracket 69 connected to its front end which has LED 70 mounted therein. The rear end of position indicator plate 68 is secured to a transverse support plate 71 that has a pair of spaced bore holes that allows it to travel up and down the vertical support shafts that are located on both sides of said T.V. camera 52. As camera 52 travels upwardly and downwardly LED 70 is visible through vertical slot 72.

We claim:

1. A microscopy system comprising;

a research microscope having an optical housing having a rotatable turret with a plurality of different power objective magnification lenses mounted on the bottom of said optical housing, said microscope having a base and a specimen platform;

a condensing lens positioned in alignment beneath said specimen platform for directing light up through a specimen;

a light source located below said condensing lens;

a projection housing mounted on the top of the optical housing of said microscope;

said projection housing having a vertically oriented tubular member having a top end and a bottom end, a projection lens is mounted in the bottom end of said tubular member;

projected image receiving means mounted in said projection housing for receiving an image projected upwardly through said projection lens;

means for adjusting the distance between said projection lens and said image receiving means to thereby control the amount of magnification of a projected image; said image receiving means comprises a motor mounted on a vertically oriented rod, said motor being rigidly connected to said image receiving means so that they move upwardly and downwardly as a single unit.

2. A microscopy system comprising:

a research microscope having an optical housing having a rotatable turret with a plurality of different power objective magnification lenses mounted on the bottom of said optical housing, said microscope having a base and a specimen platform;

a condensing lens positioned in alignment beneath said specimen platform for directing light up through a specimen;

a light source housing;

a fiberoptic cable connected between said light source housing and said condensing lens;

a projection housing mounted on the top of the optical housing of said microscope;

said projection housing having a vertically oriented tubular member having a top end and a bottom end, a projection lens is mounted in the bottom end of said tubular member;

projection image receiving means mounted in said projection housing for receiving an image projected upwardly through said projection lens; and means for adjusting the distance between said projection lens and said image receiving means to thereby control the amount of magnification of a projected image; said image receiving means comprises a motor mounted on a vertically oriented rod, said motor being rigidly connected to said image receiving means so that they move upwardly and downwardly as a single unit.

3. A microscopy system as recited in 2 wherein said projected image receiving means is a video camera.

4. A microscopy system as recited in claim 3 further comprising a video monitor electrically connected to said video camera.

5. A microscopy system as recited in claim 4 further comprising a VCR electrically connected to said video monitor.

6. A microscopy system as recited in claim 4 further comprising a video printer electrically connected to said video monitor.

7. A microscopy system comprising:

a research microscope having an optical housing having a rotatable turret with a plurality of different power objective magnification lenses mounted on the bottom of said optical housing, said microscope having a base and a specimen platform;

a condensing lens positioned in alignment beneath said specimen platform for directing light up through a specimen;

a light source located below said condensing lens;

a projection housing mounted on the top of the optical housing of said microscope; said projection housing having a vertically oriented tubular member having a top end and a bottom end, a projection lens is mounted in the bottom end of said tubular member;

a video camera mounted in said projection housing for receiving an image projected upwardly through said projection lens; and means for adjusting the height of said video camera within said projection housing to vary the distance between said projection lens and said video camera to thereby control the amount of magnification of a projected image while maintaining its depth of field and resolution.

* * * * *